US009290264B2

(12) United States Patent
Charles et al.

(10) Patent No.: US 9,290,264 B2
(45) Date of Patent: Mar. 22, 2016

(54) AIRCRAFT SELECTIVELY ENGAGEABLE ELECTRIC TAXI SYSTEM

(71) Applicant: HONEYWELL INTERNATIONAL INC., Morristown, NJ (US)

(72) Inventors: David Lane Charles, South Bend, IN (US); Donald Jeffrey Christensen, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 314 days.

(21) Appl. No.: 14/099,162

(22) Filed: Dec. 6, 2013

(65) Prior Publication Data

US 2014/0332622 A1   Nov. 13, 2014

Related U.S. Application Data

(60) Provisional application No. 61/822,787, filed on May 13, 2013.

(51) Int. Cl.
*B64C 25/50* (2006.01)
*B64C 25/40* (2006.01)

(52) U.S. Cl.
CPC ............. *B64C 25/405* (2013.01); *Y02T 50/823* (2013.01)

(58) Field of Classification Search
CPC ........ B64C 25/40; B64C 25/42; B64C 25/44; B64C 25/50; B64C 25/505; Y02T 50/823
USPC ................. 244/50, 51, 103 R, 104 R, 104 LS
See application file for complete search history.

(56) References Cited

U.S. PATENT DOCUMENTS

| 2,050,741 A | * | 8/1936 | Speir | B64C 25/40 244/103 S |
| 4,955,627 A | | 9/1990 | Hartmann | |
| 5,819,899 A | * | 10/1998 | Iga | F16D 41/07 192/110 B |

(Continued)

FOREIGN PATENT DOCUMENTS

| DE | 102008006295 A1 | 7/2009 |
| GB | 603792 A | 6/1948 |
| GB | 612523 A | 11/1948 |

OTHER PUBLICATIONS

Search Report from EP Application No. 14165708.0 dated Jul. 23, 2014.

(Continued)

*Primary Examiner* — Brian M O'Hara
*Assistant Examiner* — Assres H Woldemaryam
(74) *Attorney, Agent, or Firm* — Shimokaji IP

(57) ABSTRACT

An electric taxi system (ETS) for an aircraft may include an annular output gearbox positioned between a wheel and a main strut of a main landing gear of the aircraft. The output gearbox may surround a brake piston assembly of the wheel of the aircraft. One or more selectively operable engaging assemblies, for selectively coupling the ETS with the wheel of the aircraft, may be positioned between the output gearbox and the wheel of the aircraft. The one or more selectively operable engaging assemblies may be coupled with an output gear of the output gearbox to rotate with the output gear.

6 Claims, 11 Drawing Sheets

(56) References Cited

U.S. PATENT DOCUMENTS

| | | | | | |
|---|---|---|---|---|---|
| 5,927,455 | A | * | 7/1999 | Baker | B60K 23/08 192/36 |
| 7,766,790 | B2 | * | 8/2010 | Stevenson | B60K 6/365 192/43.1 |
| 8,857,544 | B2 | * | 10/2014 | Essinger | B64C 25/405 180/65.51 |
| 2007/0284939 | A1 | * | 12/2007 | Charles | B60T 1/10 303/152 |
| 2009/0026312 | A1 | * | 1/2009 | Hadley | B64C 25/50 244/100 R |
| 2011/0156472 | A1 | * | 6/2011 | Bucheton | B64C 25/405 301/6.2 |
| 2012/0104159 | A1 | * | 5/2012 | Charles | B64C 25/405 244/50 |
| 2012/0126053 | A1 | * | 5/2012 | Christensen | B64C 25/405 244/50 |

OTHER PUBLICATIONS

EP Examination Report from EP Application No. 14165708.0 dated Aug. 27, 2014.

\* cited by examiner

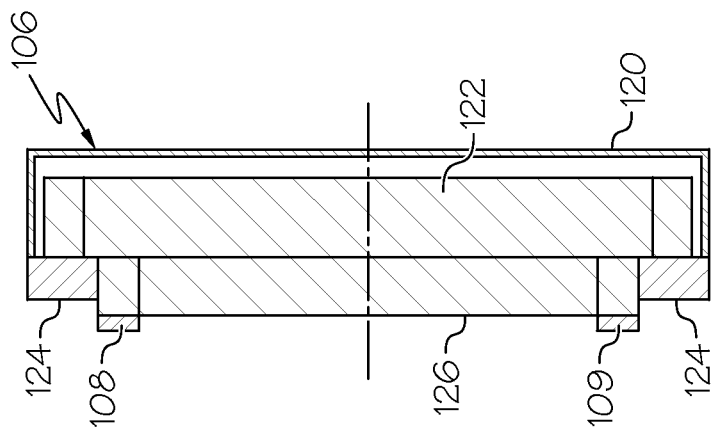
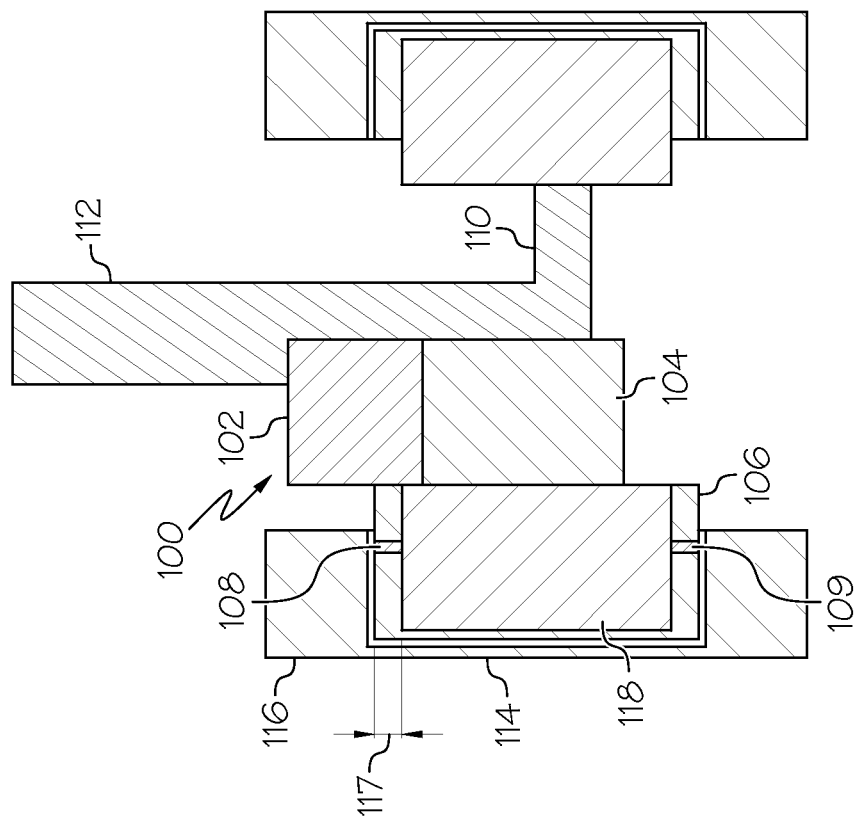

AIRCRAFT SELECTIVELY ENGAGEABLE ELECTRIC TAXI SYSTEM

BACKGROUND OF THE INVENTION

The present invention generally relates to aircraft landing gear. More particularly, the invention relates to landing gear with integrated electric drive systems to propel an aircraft during taxiing.

A typical aircraft may taxi to and from runways with thrust force developed by its engines. A significant amount of fuel may be burned by the engines during a typical aircraft taxi profile before and after each flight. In many cases, the main engines may provide more motive force than is required to complete a successful taxi profile. In that regard, engine-thrust taxiing may be considered inefficient and may contribute to high fuel costs and ground level emissions.

Aircraft designers have sought a more efficient method for propelling an aircraft during taxiing. Electric taxi systems (ETS) have been proposed to provide higher efficiency. An ETS may be implemented by using electrical motors to provide the motive force for aircraft taxiing. While this general ETS concept holds promise for improved efficiency, there are practical application problems that need to be addressed in any successful ETS design. For example, it is desirable that an ETS should be selectively engageable with wheels of the aircraft so that the ETS does not impact normal take-off and landing procedures or aircraft performance. It is also desirable to construct an ETS with compact and lightweight components which may be retrofitted onto existing aircraft and may perform reliably even when exposed to varying environmental conditions that may be encountered by the aircraft at various airports.

As can be seen, there is a need for a selectively engageable ETS which may not interfere with normal take-off and landing procedures or aircraft performance. In that regard, it would be desirable to construct an ETS with a self-disengaging system interposed between an electric-motor drive train and an aircraft wheel. More particularly, there is a need for a self-disengaging system for such an ETS which may be compact in size, which may operate reliably under widely varying environmental conditions and which may be retrofitted onto existing aircraft with minimal structural changes to the existing aircraft.

SUMMARY OF THE INVENTION

In one aspect of the present invention, an electric taxi system (ETS) for an aircraft may comprise: an output gearbox positioned between wheels of a landing gear of the aircraft, the output gearbox surrounding a brake piston assembly of one of the wheels of the aircraft; and one or more selectively operable engaging assemblies for selectively coupling the ETS with the one of the wheels of the aircraft, the one or more engaging assemblies being positioned between the output gearbox and the one of the wheels of the aircraft, the one or more selectively operable engaging assemblies being coupled with an output gear of the output gearbox to rotate with the output gear.

In another aspect of the present invention, apparatus for selectively engaging an electric taxi system (ETS) with a wheel of an aircraft, the apparatus comprising: one or more engaging assemblies drivably coupled to an electric motor of the ETS, the one or more engaging assemblies having a hemispherically shaped leading end; and a wheel-drive device attached to a wheel of the aircraft, the wheel-drive device including a hemispherical socket positioned to be engageable with the leading end of an engaging member of one of the engaging assemblies when the engaging member is extended outwardly.

In still another aspect of the present invention, apparatus for selectively engaging an ETS with a wheel of an aircraft may comprise: an annular engaging ring positioned in an annular space between a rim of the wheel and a brake piston assembly, the engaging ring being rotatably coupled to an electric motor of the ETS; a first and a second spring-biased engaging assembly coupled to the engaging ring and positioned in the annular space.

These and other features, aspects and advantages of the present invention will become better understood with reference to the following drawings, description and claims.

BRIEF DESCRIPTION OF THE DRAWINGS

FIG. 1 is a schematic diagram of an electric taxi system (ETS) in accordance with an embodiment of the invention;

FIG. 2 is a schematic sectional view of an output gearbox and engaging assemblies in accordance with an embodiment of the invention;

DETAILED DESCRIPTION OF THE INVENTION

Figure 3:
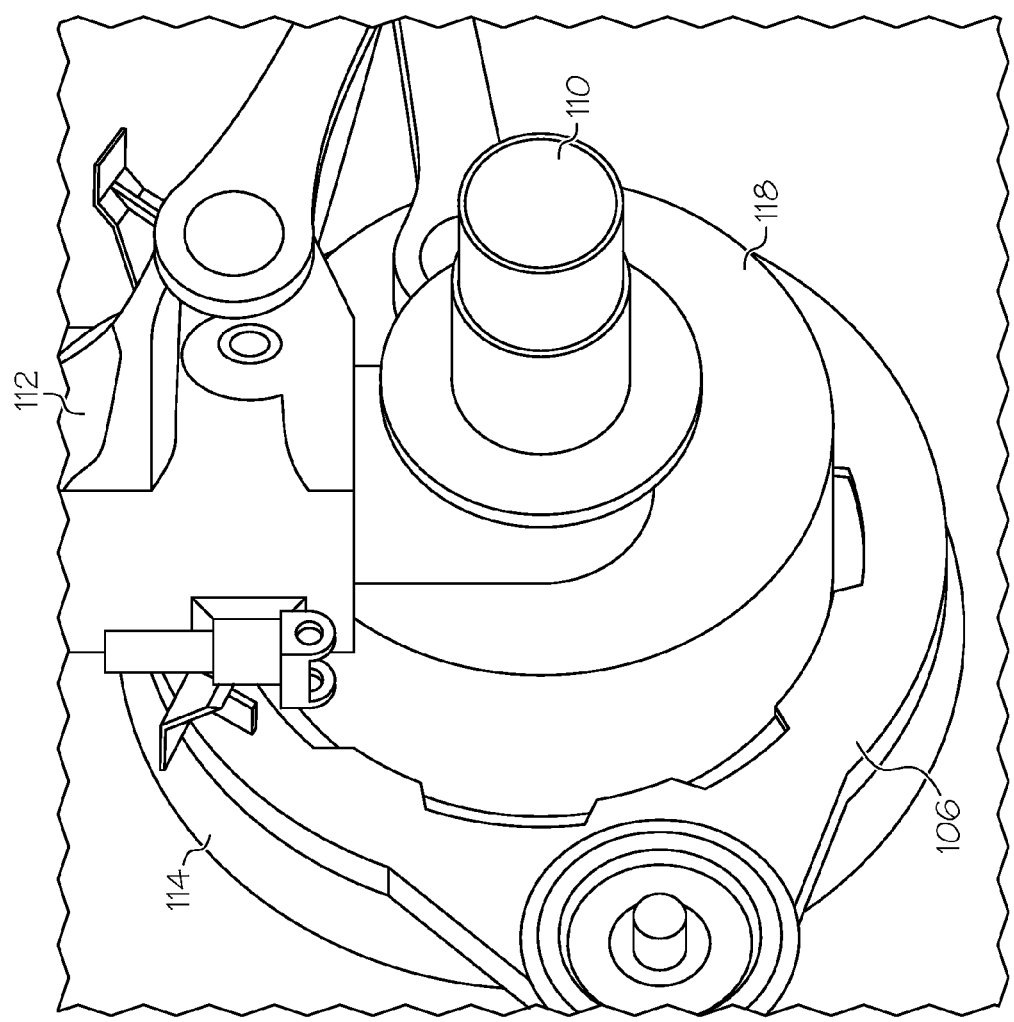
FIG. 3 is a perspective view of the output gearbox of FIG. 2 in accordance with an embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides an ETS for an aircraft. The ETS may employ a selective engaging system interposed between an electric motor and a landing-gear wheel. The system may be capable of self-disengagement when wheel speed exceeds driving speed of the electric motor. The ETS may be retrofitted onto main landing gear assemblies of existing aircraft with minimal modifications of landing gear supporting and retracting systems.

Referring now to FIG. 1, an exemplary embodiment of an ETS 100, which may be installed in an aircraft, is shown in schematic form. The ETS 100 may include an electric motor 102, an intermediate gearbox 104 coupled to the motor 102, an output gearbox 106 coupled with the gearbox 104 and engagement assemblies 108 and 109. The ETS 100 may be installed on a conventional aircraft landing gear assembly 101 which may include a main strut 112, an axle 110, wheels 114, tires 116 and brake piston assemblies 118. Advantageously, components of the ETS 100 may be installed onto the landing gear assembly with little or no modification of the components of the landing gear assembly. Thus the ETS 100 may be suitable for being retrofitted onto main landing gear of existing aircraft. Additionally, the ETS 100 may be retrofitted into nose landing gear which may or may not be fitted with brake assemblies.

Figure 4:
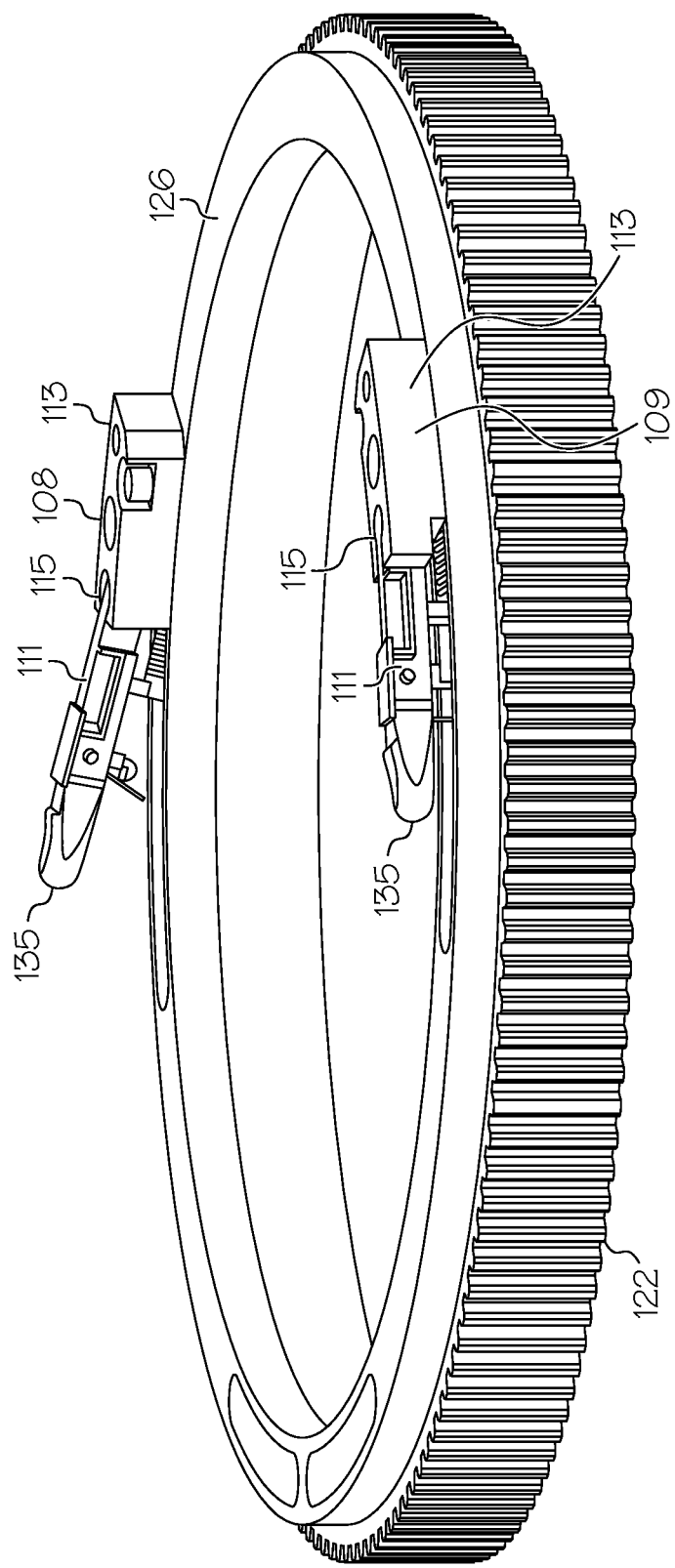
FIG. 4 is a perspective view of an output gear and engaging assemblies in accordance with an embodiment of the invention.

Referring now to FIGS. 2, 3 and 4, it may be seen that the output gearbox 106 may surround the brake piston assembly 118. The output gearbox 106 may include a housing 120 that may surround a pinion-driven output gear or ring gear 122. An engaging ring 126 may be coupled with the ring gear 122. The engaging ring 126 may be supported in the housing 120 on sealed bearings 124. Engaging assemblies 108 and 109 may be coupled with the engaging ring 126. Referring back to FIG. 1, it may be seen that the engaging assemblies 108 and 109 may be positioned radially inwardly of a rim of the wheel 114 and radially outwardly of the brake piston assembly 118. In other words, the engaging assemblies 108 and 109 may be positioned within an annular space 117 between the wheel 114 and the brake piston assembly 118.

In FIG. 4, one of the engaging assemblies, 108 is illustrated in a stowed or latched state and one of the engaging assemblies, 109, is shown in an axially extended state. Each of the engaging assemblies 108 and 109 may include an engaging member 111 and a base member 113. The engaging member 111 may be coupled to the base member 113 with a ball and socket connector 115

Figure 5:
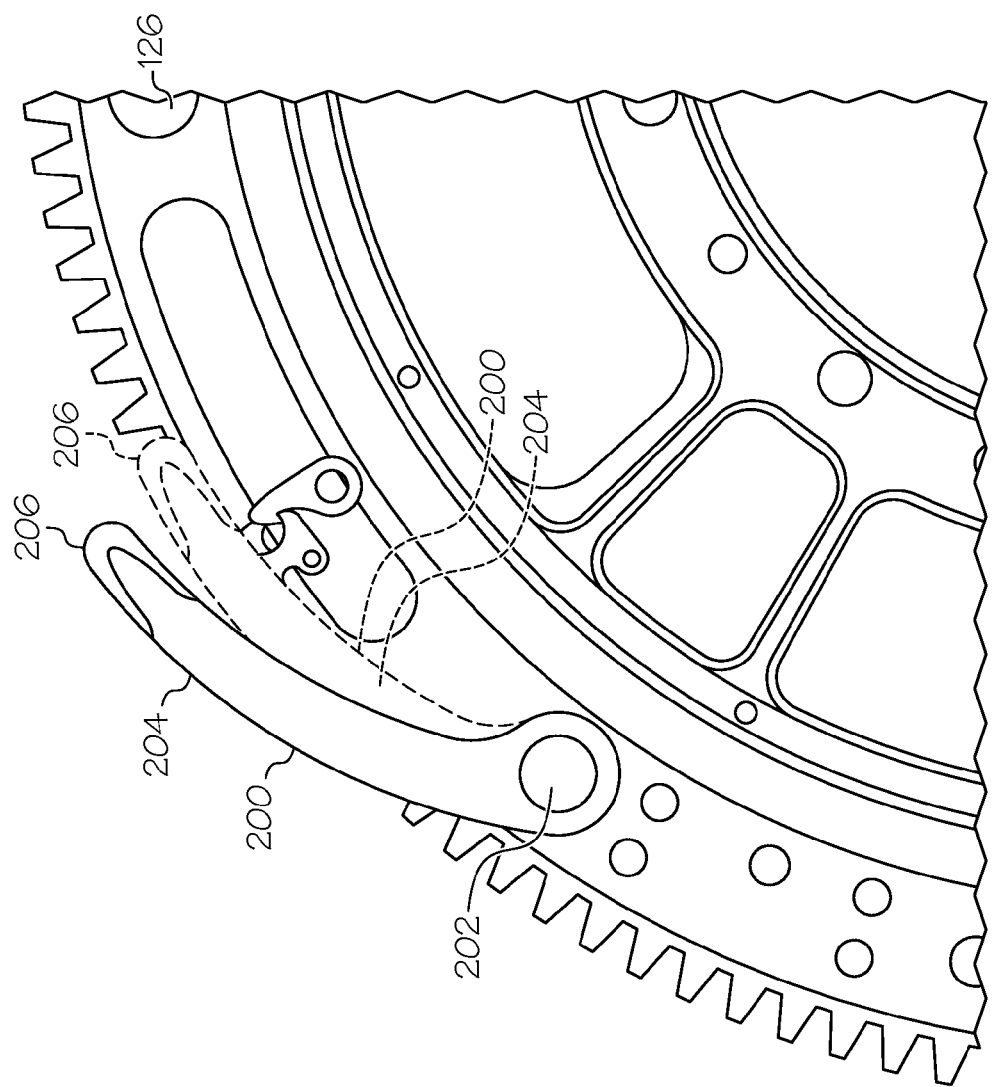
FIG. 5 is a perspective view of an output gear and engaging assemblies in accordance with a second embodiment of the invention.

Referring now to FIG. 5, there is shown another exemplary embodiment of an engaging assembly 200. The engaging assembly 200 may be coupled to the engaging ring 126 so that it may pivot on a pivot pin 202 to extend in a radial direction. The engaging assembly 200 may include an engaging member 204 and a hemispherically shaped leading end 206. In FIG. 5, the engaging assembly 200 is shown in its radially extended state. The engaging assembly 200 is also shown in dotted format in its retracted or stowed state.

Figure 6:
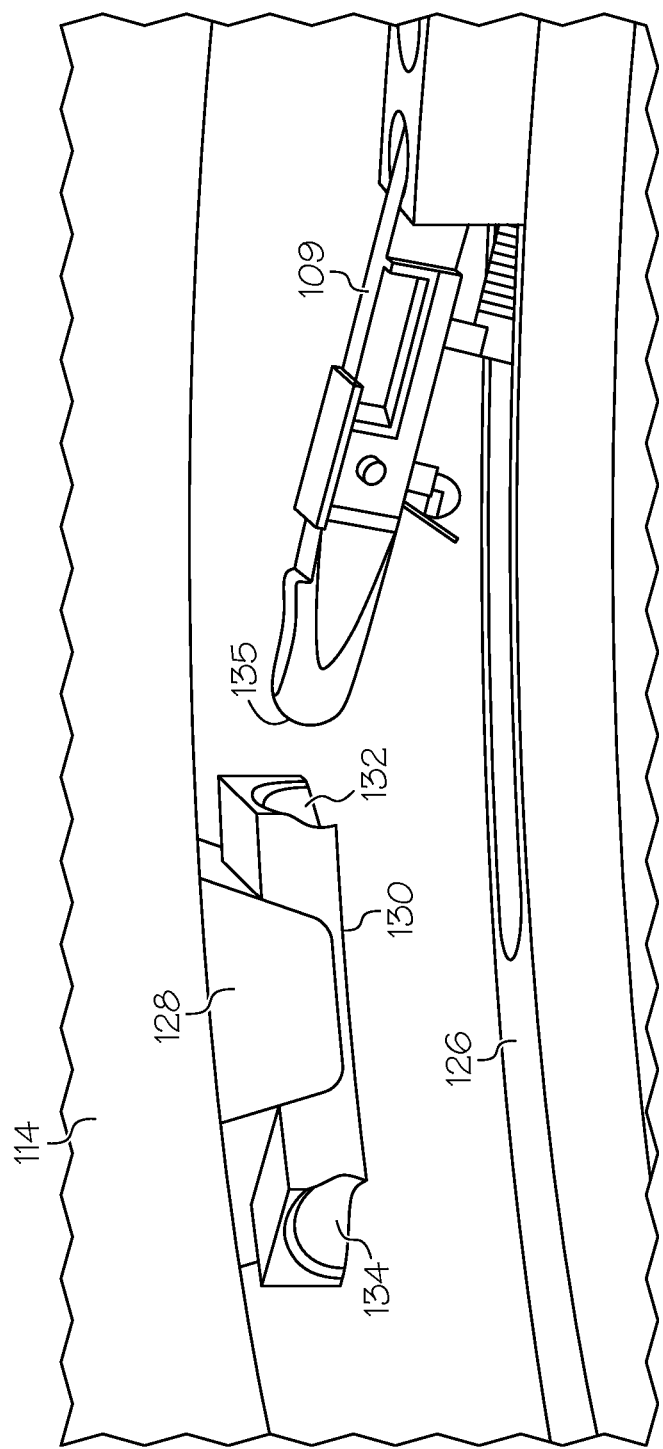
FIG. 6 is a perspective view of an engaging assembly and a wheel-drive device in accordance with an embodiment of the invention.

Referring now to FIG. 6, it may be seen that the wheel 114 may be provided with a driving lug 128. A wheel-drive device 130 may be coupled with the lug 128. The wheel-drive device 130 may be provided with a hemispherical socket 132 oriented in a clockwise direction and a hemispherical socket 134 oriented in a counterclockwise direction. In operation, one of the engaging assemblies 108 or 109, in an extended state, may engage with one of the hemispherical sockets 132 or 134 when there is relative rotational motion between the wheel 114 and the engaging ring 126. In the configuration of FIG. 6, a leading end 135 of the engaging assembly 109, in an extended state, may engage with the socket 132 whenever the engaging ring 126 rotates in a counterclockwise direction faster than the wheel 114. After such engagement, the wheel 114 may be driven at the same rotational speed as the engaging ring 126. Conversely, a leading end 135 of the engaging assembly 108 may engage with the socket 134 when the engaging assembly 108 is in an extended state and when the engaging ring 126 rotates in a clockwise direction faster than the wheel 114. The hemispherical shape of the sockets 132 and 134 and the leading ends 135 may facilitate ease of engagement. Thus the output gearbox 106 of FIG. 1 may drive the wheel 114 to taxi an aircraft in either a forward or reverse direction.

Referring back to FIG. 4, it may be noted that the engaging members 111 may be provided with spherically or hemispherically shaped ends and that each of the ends may interact with correspondingly shaped spherically or hemispherically shaped sockets 132 and 134. Consequently, the engaging members may articulate slightly when the tire 166 (See FIG. 1) of the aircraft may distort due to aircraft movement during taxiing.

Figure 7:
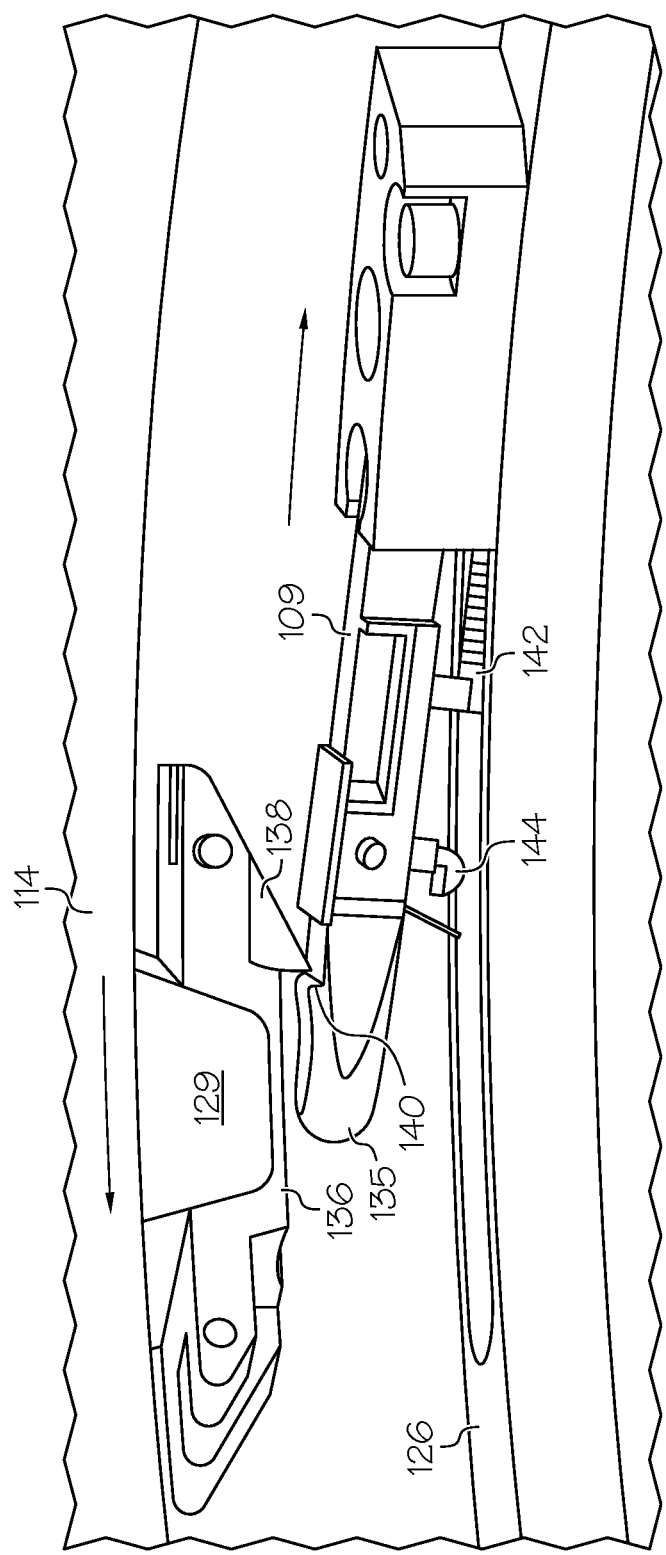
FIG. 7 is a perspective view illustrating an operational arrangement of a stowing device and one of the engaging assemblies of FIG. 4 in accordance with an embodiment of the invention.
Figure 8:
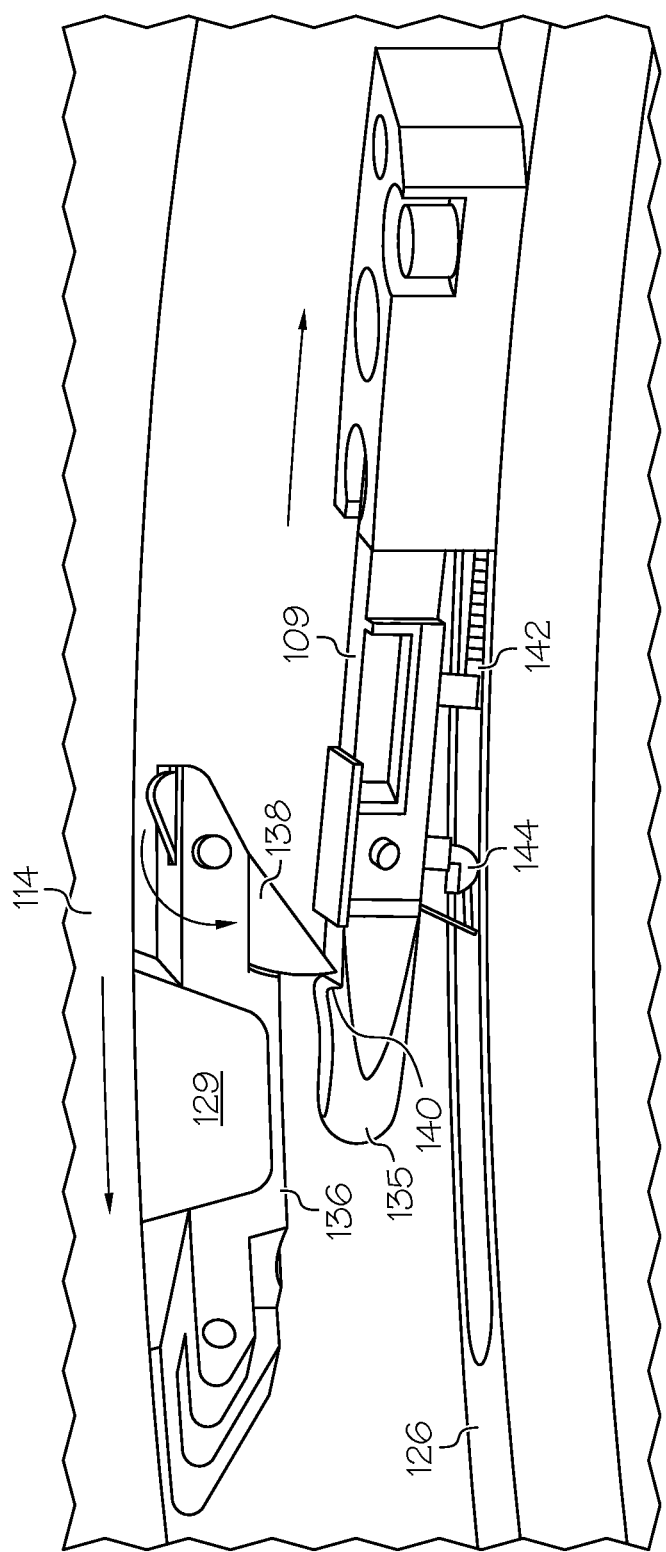
FIG. 8 is a perspective view illustrating an operational arrangement of the elements of FIG. 7 in a further stage of operation in accordance with an embodiment of the invention.

Referring now to FIGS. 7 and 8, there is shown a stowing device 136 positioned to push the engaging assembly 108 into a latched state. The stowing device 136 may be coupled with a stowing lug 129 of the wheel 114. The stowing lug 129 may be positioned diametrically opposite the driving lug 128. In operation, the stowing device 136 may push the engaging assembly into a latched state whenever rotational speed of the wheel 114 may exceed rotational speed of the engaging ring 126. This condition may occur, for example, when a pilot initiates a counter rotation of the ETS after completion of a taxiing activity. Typically, the counter rotation may be performed when an aircraft arrives at a gate or after an aircraft stops on a runway just prior to initiation of takeoff. Stowing may also occur even if a pilot fails to initiate counter-rotation of the ETS during takeoff of the aircraft because, in that case, the wheels of the aircraft will rotate faster than the engaging ring 126. In any of these circumstances, the engaging assembly 109 may disengage from the socket 132 (See FIG. 6). The wheel 114 may rotate relative to the engaging ring 126 until the stowing device 136 may engage with the engaging assembly 109.

As the engaging assembly 109 may pass under the stowing device 136, a pivotable lever 138 may contact a projection 140 of the engaging assembly 109. The lever 138 may be drawn downwardly as shown in FIG. 7 by pulling force developed from relative motion between the projection 140 and the wheel 114. As the lever 138 may be drawn downwardly, a spring 142 may be compressed and the engaging assembly 109 may be pushed into its latched or stowed state. A spring-biased latch 144 may secure the engaging assembly 109 in its stowed or latched state until such later time that a need to drive the wheel 114 with the ETS 100 may arise. The lever 138 may be torsion-spring biased so that it may return to a retracted position to await the next opportunity to stow one of the engaging assemblies 108 or 109.

Figure 9:
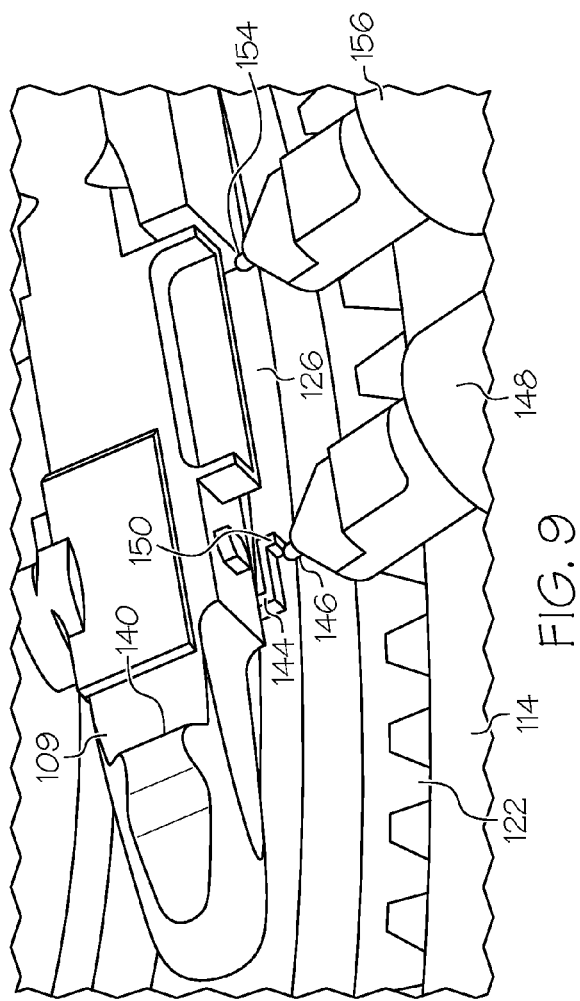
FIG. 9 is a perspective view of a latch release system in accordance with an embodiment of the invention.
Figure 10:
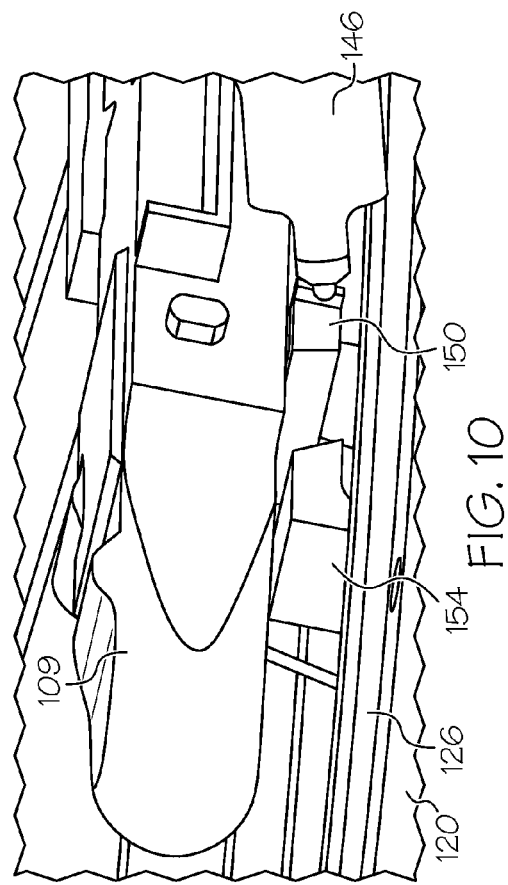
FIG. 10 is a second perspective view of the latch release system of FIG. 8 in accordance with an embodiment of the invention.
Figure 11:
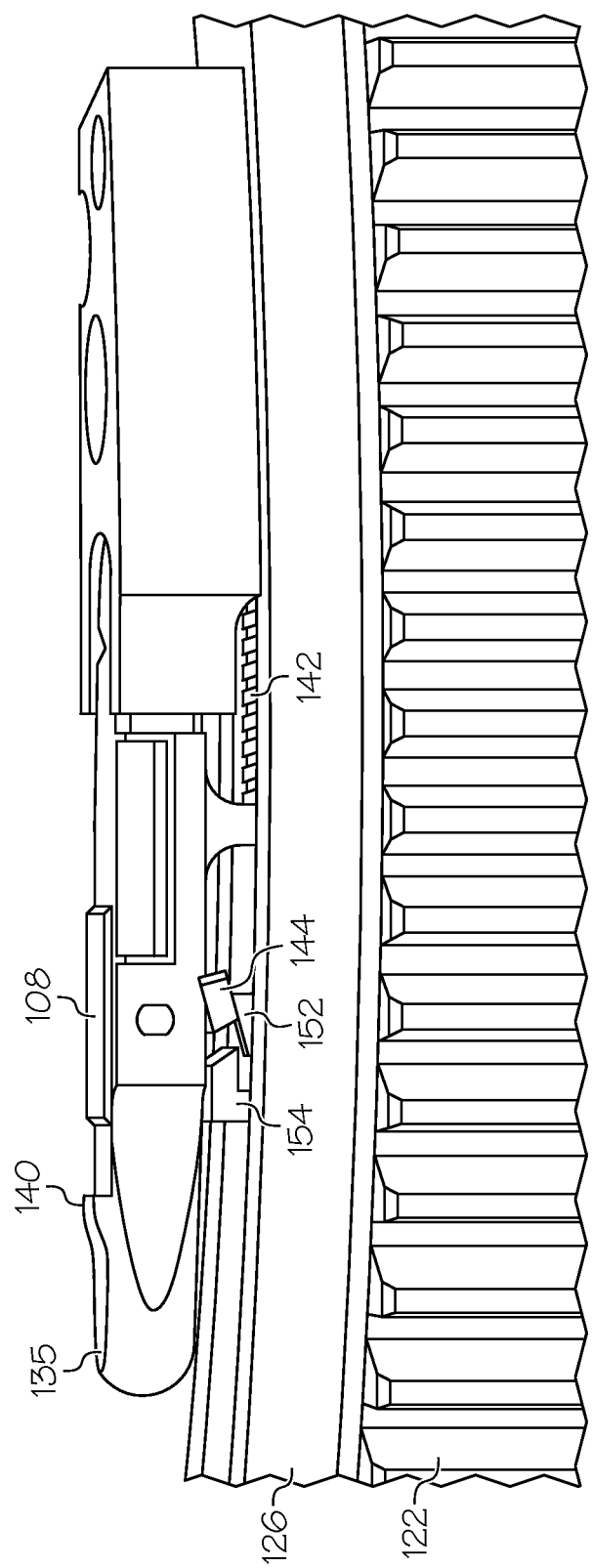
FIG. 11 is a perspective view of one of the engaging assemblies in a latched state in accordance with an embodiment of the invention.

Referring now to FIGS. 9, 10 and 11, it may be seen that a solenoid-operated pin 146 may be employed to release the latch 144 and allow the engaging assembly 109 to resume an extended state. A solenoid 148 may be attached to the housing 106 of the gearbox 120 (See FIG. 2). The pin 146 may be extended by operation of the solenoid 148 whenever a pilot of the aircraft elects to activate the ETS 100.

When the pin 146 is extended, it may travel along an axis that may intersect a path of a release lever 150 of the latch 144 of the engaging assembly 109. As the wheel 114 and/or the engaging ring 126 may rotate relative to one another, the release lever 150 may come into contact with the extended pin 146. This may result in a locking member 152 of the latch 144 being pulled away from a locking bracket 154 of the engaging ring 126 as shown in FIG. 11. The spring 142 may force the engaging assembly 109 into an extended state.

After the engaging assembly 109 is in an extended state, continued counterclockwise rotation of the ring gear 122 may result in the engaging assembly 109 contacting the socket 132 of the driving device 130 (See FIG. 6). Additional counterclockwise rotation of the ring gear 122 may result in the wheel 114 being driven in a counterclockwise direction.

Figure 12:
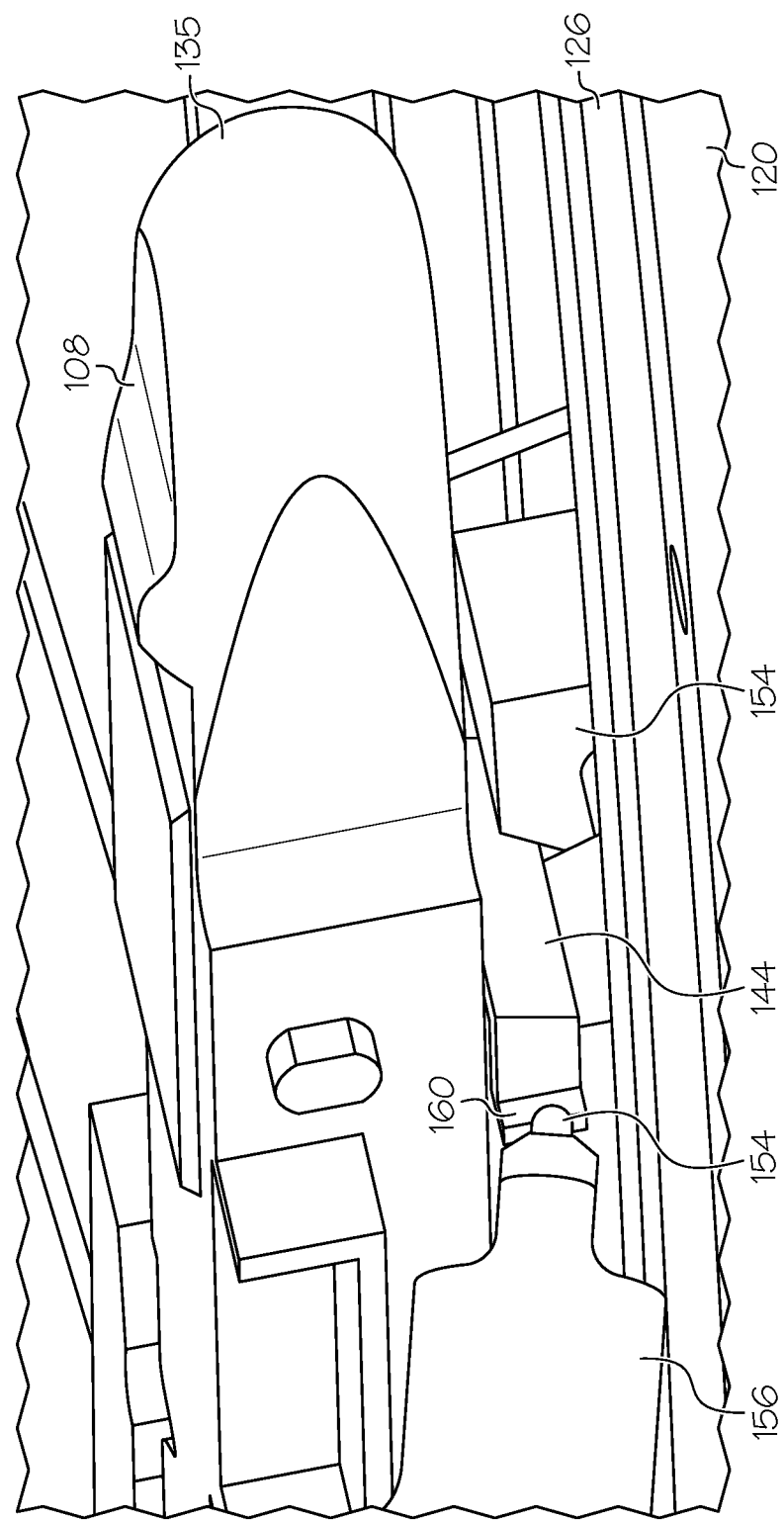
FIG. 12 is a perspective view of a second latch release system of in accordance with an embodiment of the invention.

Referring now to FIGS. 9 and 12, it may be noted that a second solenoid-actuated pin 156 may be positioned so that, when extended, the pin 156 may travel along an axis that may intersect a path of a release lever 160 of the engaging assembly 108. It may also be noted that the release lever 160 of the engaging assembly 108 may differ in shape from the release lever 150 of the engaging assembly 109. The pins 156 and 146 may extend along axes which are not co-planar. Referring particularly to FIG. 9, it may be seen the release lever 146 may travel in an arc that is a first radial distance from the ring gear 122. Referring particularly to FIG. 12, it may be seen that the release lever 160 may travel in an arc that is a second radial distance from the ring gear 122. The pin 146 may extend along an axis that may intersect the arc of travel of the release lever 150. The pin 156 may extend along an axis that may intersect the arc of travel of the release lever 160.

Thus, by selectively actuating the solenoid-operated pin 146, the engaging assembly 109 may become positioned in its extended state and the ETS 100 may become prepared to drive the wheel 114 in a counterclockwise direction. Meanwhile the engaging assembly 108 may remain in its stowed or latched state so that it may not interfere with operation of the ETS 100 as the wheel 114 is driven in a counterclockwise direction.

Conversely, the solenoid-operated pin 156 may be selectively actuated when a pilot may elect to drive the wheel in a clockwise direction. In that case the pin 156 may engage with the release lever 160 and the engaging assembly 108 may become positioned in its extended state so that the ETS 100 may drive the wheel 114 in a clockwise direction. Meanwhile the engaging assembly 109 may remain in its stowed or latched state so that it may not interfere with operation of the ETS 100 as the wheel 114 is driven in a clockwise direction.

Figure 13:
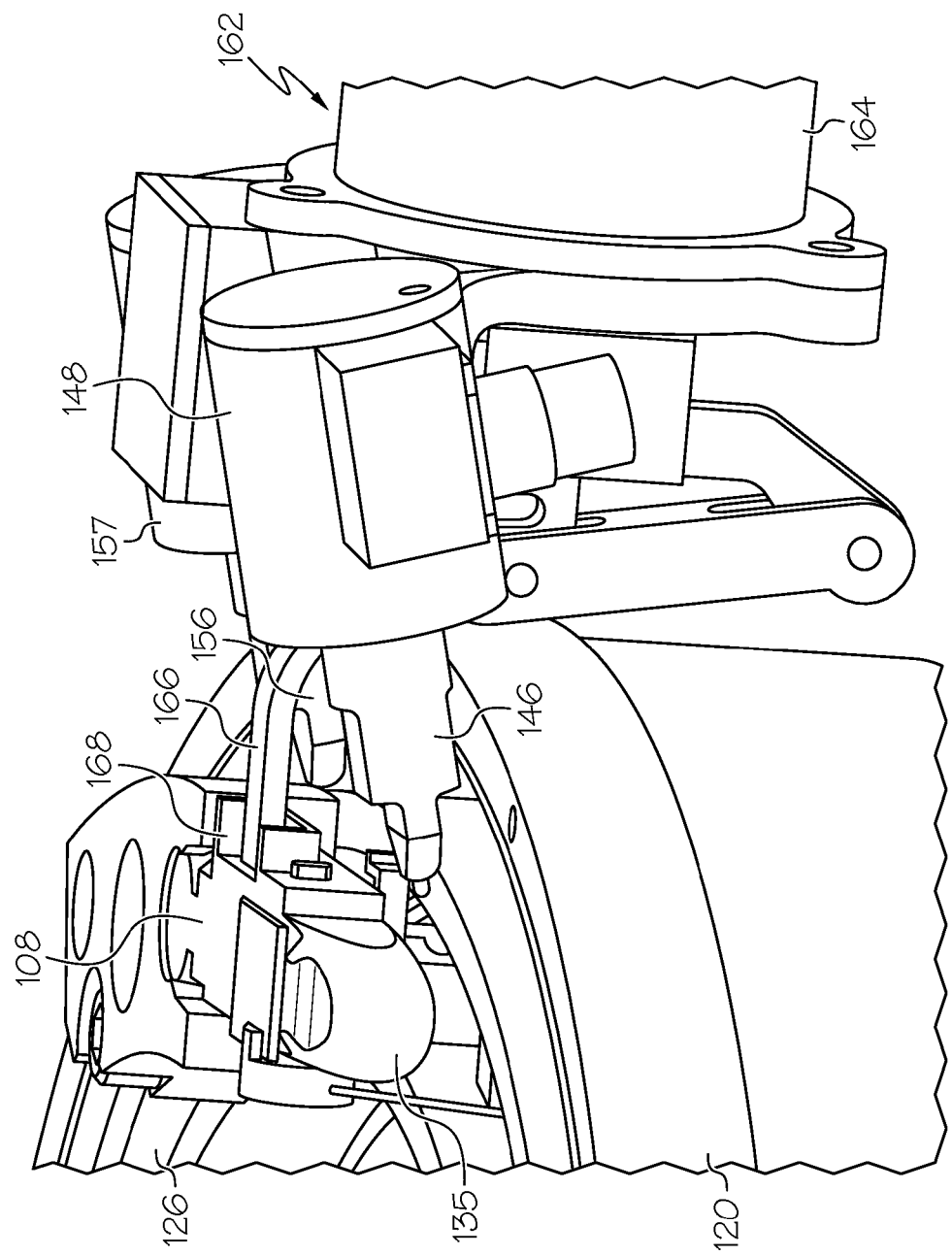
FIG. 13 is a perspective view of a secondary latching unit in accordance with an embodiment of the invention

Referring now to FIG. 13, it may be seen that the ETS 100 may be provided with secondary latching units 162 for securing the engaging assemblies 108 and 109 in their respective stowed states whenever the aircraft may be in a take-off, in-flight or landing mode. In an exemplary embodiment each of the secondary latching unit 162 may include a solenoid 164 attached to the housing 120. The solenoid 162 may selectively engage a latching lever 166 with a slot 168 on the engaging assembly 108 or 109, thus holding the engaging assembly securely in a stowed state.

It should be understood, of course, that the foregoing relates to exemplary embodiments of the invention and that modifications may be made without departing from the spirit and scope of the invention as set forth in the following claims.

We claim:
1. An apparatus for selectively engaging an electric taxi system (ETS) with a wheel of an aircraft, the apparatus comprising:
   one or more engaging assemblies drivably coupled to an electric motor of the ETS, the one or more engaging assemblies having a hemispherically shaped leading end;
   a wheel-drive device attached to a wheel of the aircraft, the wheel-drive device including a hemispherical socket positioned to be engageable with the leading end of an engaging member of one of the engaging assemblies when the engaging member is extended outwardly;
   a first one of the one or more engaging assemblies has a first engaging member with a leading end oriented in a clockwise direction; and
   a second one of the one or more engaging assemblies has a second engaging member with a leading end oriented in a counterclockwise direction.

2. The apparatus of claim 1 further comprising:
   an engaging ring positioned coaxially with the wheel, the engaging ring being drivably coupled with the electric motor of the ETS;
   wherein the one or more engaging assemblies are coupled to the engaging ring, the one or more engaging assemblies being positioned outwardly of a brake piston assembly of the wheel; and
   wherein the engaging members of the one or more engaging assemblies are spring biased and selectively extend outwardly to engage with the wheel-drive device, thereby selectively transmitting rotational force from the electric motor to the wheel.

3. The apparatus of claim 1 wherein the wheel-drive device includes: a first socket oriented in a clockwise direction and positioned axially to be engageable with the first engaging member when the first engaging member is extended axially outwardly; and a second socket oriented in a counterclockwise direction and positioned axially to be engageable with the second engaging member when the second engaging member is extended axially outwardly.

4. The apparatus of claim 1: wherein the one or more engaging assemblies include a base member; and wherein the engaging members are coupled to the base members with a ball and socket connector.

5. The apparatus of claim 1 further comprising: a stowing device coupled to the wheel, wherein the stowing device has one or more pivotable levers positioned to engage with a projection of a axially extended one of the one or more engaging assemblies and force the engaging assembly into a stowed position whenever the wheel rotates faster than the engaging ring.

6. The apparatus of claim 1 wherein: the one or more engaging assemblies are positioned radially inwardly of a rim of the wheel; and the one or more engaging assemblies selectively extend axially outwardly to engage with the wheel-drive device.

* * * * *